INVENTORS
GEORGE B. ERSKINE
STANLEY J. GARTNER
BY
Amster + Levy
ATTORNEYS

# United States Patent Office 3,141,361
Patented July 21, 1964

3,141,361
MACHINE AND SWAGING MECHANISM FOR THE MANUFACTURE OF STUDDED ELECTRODES
George B. Erskine and Stanley J. Gartner, Emporium, Pa., assignors to Emporium Specialties Co., Inc., Emporium, Pa., a corporation of Pennsylvania
Original application Oct. 3, 1957, Ser. No. 687,913, now Patent No. 2,951,933, dated Sept. 6, 1960. Divided and this application Jan. 22, 1960, Ser. No. 4,118
3 Claims. (Cl. 78—23)

The present invention relates generally to an improved machine and method for the manufacture of studded electrodes, and in particular to an improved mechanism for swaging studs for such electrodes in an automatic machine for mounting one or more groups of radially-extending circumferentially-spaced studs of an electrode body. This is a division of our copending application Serial No. 687,913, filed on October 3, 1957, entitled, Improved Machine and Method for the Manufacture of Studded Electrodes, which issued as Patent No. 2,951,933.

In the electron gun assembly of a wide variety of cathode ray tube devices, such as television picture tubes, it is necessary to employ a series of electrodes maintained at prescribed operating potentials to form, focus and direct the electron beam. Such electrodes usually take the form of cup-like or sleeve-like electrode bodies each having a number of radially-extending mounting studs or pins welded to their outer peripheries at circumferentially-spaced locations. The studs or pins are usually disposed in groups spaced axially of the electrode body and provide a means by which the electrodes can be mounted in the neck section of the tube envelope. The mounting of the electrodes in the tube envelope is usually achieved by embedding flattened or swaged terminal portions of the studs in supporting rods of glass or similar thermoplastic material which serve to mount the several electrodes in the required orientation relative to each other and to the remaining components of the electron gun assembly.

It has been the general practice in the industry to construct these and other similar types of electrodes by a series of manual operations involving the use of assembly jigs and fixtures. To illustrate a typical hand assembly operation, the electrode body is supported on a jig and successive studs or pins are manually assembled with the electrode body, frequently by the use of an appropriate jig or fixture, and thereafter welded to the surface of the electrode body with the aid of a conventional bench welder. This hand method, by its very nature, is time consuming, tedious, painstaking, and necessitates multiple handlings of the studs and electrode bodies incident to achieving the final assembly. Usually, the studs are made in a first and separate operation, brought to the bench welder, and thereafter assembled as previously described. Apart from the problems attendant to the hand method of manufacture, the final electrode is frequently unsatisfactory in quality and often does not come up to accepted commercial standard. For most applications, it is essential that the mounting studs be precisely located both circumferentially and axially of the electrode body. The difficulty in obtaining a precision assembly within the prescribed tolerances established by the industry may be appreciated by considering a typical electrode which incorporates two groups of spaced studs each consisting of three studs spaced circumferentially at 120° intervals. Not only is it necessary to maintain close tolerance in the spacing of the studs in the respective groups, but it is also necessary to maintain accurate spacing and alignment between the groups. The overall problem is further complicated by the necessity of having very strong joints between the respective studs and the electrode body and by the inherent problems attendant to handling parts which are comparatively small in size, the mounting studs often being as small as one quarter of an inch in overall height.

It is within the contemplation of the present invention to provide an improved swaging mechanism coordinated within an improved bench-type automatic machine for forming studs and welding successive studs to a sleeve-like electrode body.

A knowledge of the environment of the swaging mechanism is useful for a full understanding of the many aspects and advantages of the present invention. Therefore, a brief description follows of the method of manufacture of studded electrodes in an automatic machine in which the present invention is employed. In the contemplated machine electrodes of the type including one or more radially-extending studs welded to an electrode body are manufactured by cutting off a length of wire to form a stud, swaging the rearward end of the stud to form a flattened ear or terminal, bringing the forward end of the stud into contact with the electrode body with the stud extending radially of the body, and welding the stud to the body. Thereupon, the electrode body is axially rotated through a prescribed angular traverse corresponding to the desired circumferential spacing between the successive studs and the enumerated steps are repeated to form, swage, and weld a further stud to the body at a location circumferentially spaced from the first stud. The operation is repeated, if needed, to join one or more further studs to the electrode body. If the particular studded electrode is to embody a further row or group of radially-extending studs, the body is displaced axially through a distance corresponding to the desired spacing between the groups and the assembly steps are repeated to form, swage, and weld one or more further studs to the body at circumferentially spaced locations displaced axially from the first group of studs.

An illustrative machine embodying features of the present invention for the manufacture of studded electrodes of the type including a cylindrical electrode body having a group of circumferentially-spaced, radially-extending studs welded thereto comprises a mandrel mounted for axial rotation and adapted to receive the electrode body to rotate the same whereby successive spaced locations about a circumferential path are brought into a welding position. Stud forming, swaging and transfer mechanisms are arranged to form, swage and transfer successive studs into contact with the body as the spaced locations about the circumferential path are brought into the welding position. An indexing drive is operatively connected to the mandrel for indexing the same through a prescribed angular traverse in timed relation to operation of the stud forming and transfer mechanisms. Finally, appropriate means are provided for applying welding current to successive studs brought into the welding position. In the event that the cylindrical body is to include a further group of circumferentially-spaced, radially-extending studs welded thereto, the mandrel is mounted so that it may be displaced from its first position axially through a prescribed stroke to a second position wherein the mandrel can be indexed, as in the first instance, to bring spaced locations about the second circumferential path into a welding position to receive successive studs.

The particular mechanisms herein covered include a stud forming mechanism, a stud transfer mechanism and a swaging mechanism which receives the studs from the transfer mechanism and swages the ends thereof.

After the stud forming mechanism cuts wire into appropriate lengths for studs the stud transfer mechanism transfers, in timed sequence, the studs from a transfer position to the swaging position. The swaging mechanism includes swaging jaws which are pivotally mounted and a cooperating ram which contacts follower means operatively connected to the swaging jaws such that a power stroke of the ram drives the swaging jaws about their respective pivotal mounts to accomplish the swaging operation. The operating means are provided to close the swaging jaws in a timed relation to the operating and actuating means for the transfer mechanism. Thus, the transfer mechanism holds the studs when the swaging jaws come into contact with the studs, but release same when the swaging jaws swage, and then holds the studs. The transfer mechanism is then free to engage the next successive stud produced in timed sequence by the stud forming mechanism. Swaged studs are picked up at the swaging station by the weld transfer mechanism (not covered by the present disclosure) and are transferred to the next successive station on the studded electrode machine. Thus the swaging station is clear for the next successive stud to be transferred into swaging position by the transfer mechanism and to be swaged.

The above brief description, as well as further objects, features, advantages and applications of the present invention will best be appreciated by reference to the following detailed description of a presently preferred embodiment, when taken in conjunction with the accompanying drawings wherein:

FIG. 1 is a plan view of a machine for the manufacture of studded electrodes embodying features of the present invention;

FIGS. 7 to 10, inclusive, are diagrammatic showings of some of the essential operating mechanisms of the machine in their related positions of movement during a typical sequence of operation for the formation of a studded electrode, to wit:

Preliminary to a detailed consideration of the present machine for the manufacture of studded electrodes, as shown specifically in FIGS. 1 to 6, inclusive, brief reference will be made to FIGS. 7 to 10, inclusive, for a general description of the function and operation of the several mechanisms incorporated into the present machine and their relationship to facilitate a more thorough understanding of the detailed description as the same proceeds.

Figure 10:
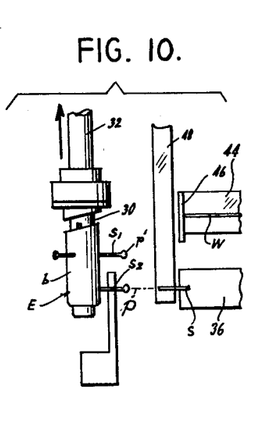
FIG. 10 is a view similar to FIG. 8 showing a swaged stud removed from the swaging mechanism, the next stud having been advanced by the transfer mechanism to the swaging station.

A typical studded electrode which may be manufactured in the present machine is shown in partially completed form in FIG. 10 and is generally designated by the letter E. In this illustrative studded electrode E, first and second groups of studs $s_1$, $s_2$ are welded to the electrode body $b$. The three studs of the group $s_1$ each extend radially and are circumferentially spaced relative to each other by 120°; while the three studs of the second group $s_2$ are similarly spaced at 120° intervals, with respective pairs of studs of the first and second groups aligned with each other. This type of studded electrode is typical, but illustrative, of the many and varied types which may be manufactured by the present machine.

The illustrative machine incorporates a mandrel 30 which is adapted to receive the electrode body $b$ and means including a supporting shaft 32 mounting the mandrel 30 for axial rotation to bring prescribed space locations about the circumference of the electrode body into a welding position. Specifically, the assembly of the mandrel 30 and its supporting shaft 32, as well as further components hereinafter described, are mounted for axial rotation in a first position whereby successive locations along a first circumferential path about the electrode body may be brought into a welding position, generally designated by the letter P. Further, the mandrel 30 and the shaft 32 may be retracted, as indicated by the directional arrow in FIG. 10, whereby successive locations along a further circumferential path about the electrode body $b$ may be brought into the welding position P.

Figure 2:
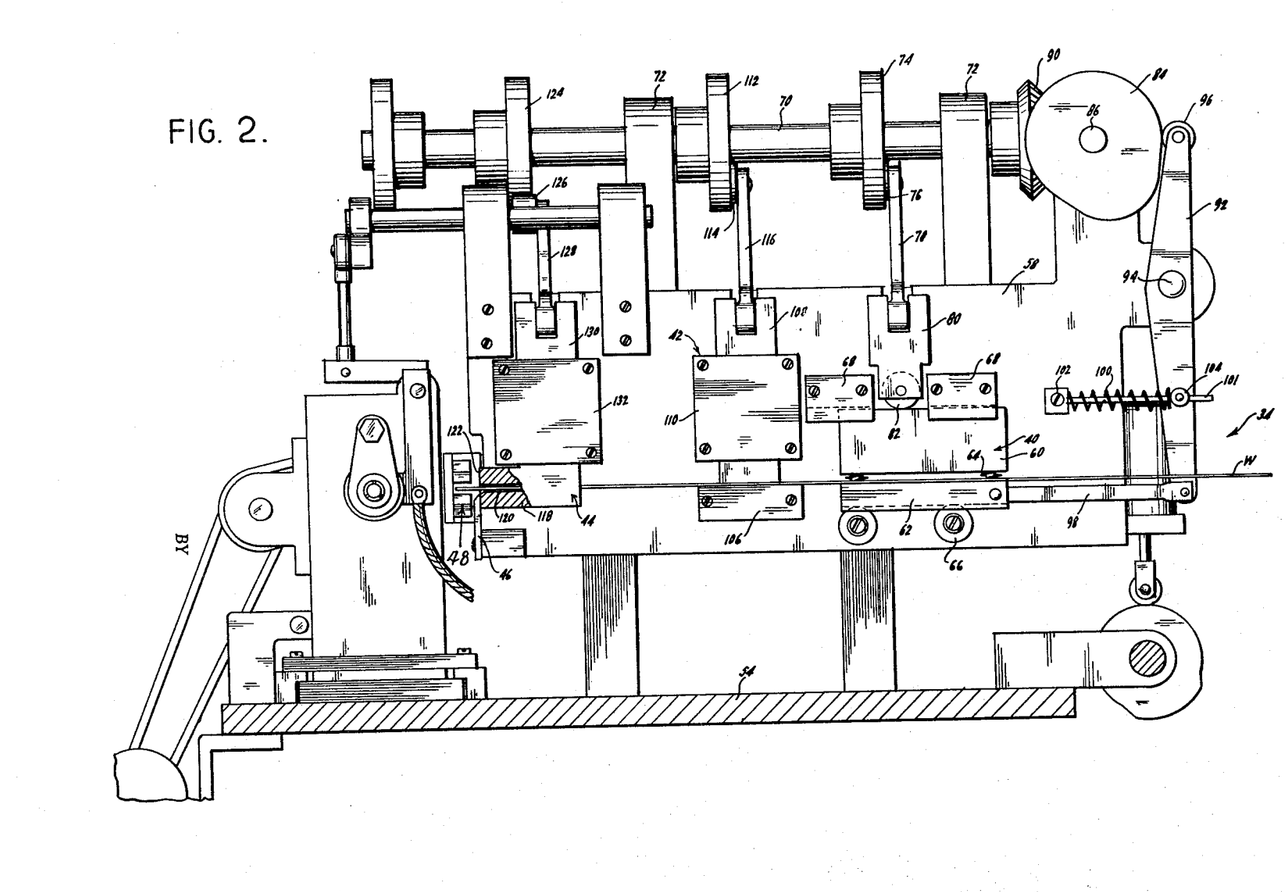
FIG. 2 is an elevational view, with parts broken away and sectioned, taken along the line 2—2 of FIG. 1a and looking in the direction of the arrows, showing the details of the wire feeding and stud forming and transfer mechanisms incorporated in the machine.
Figure 3:
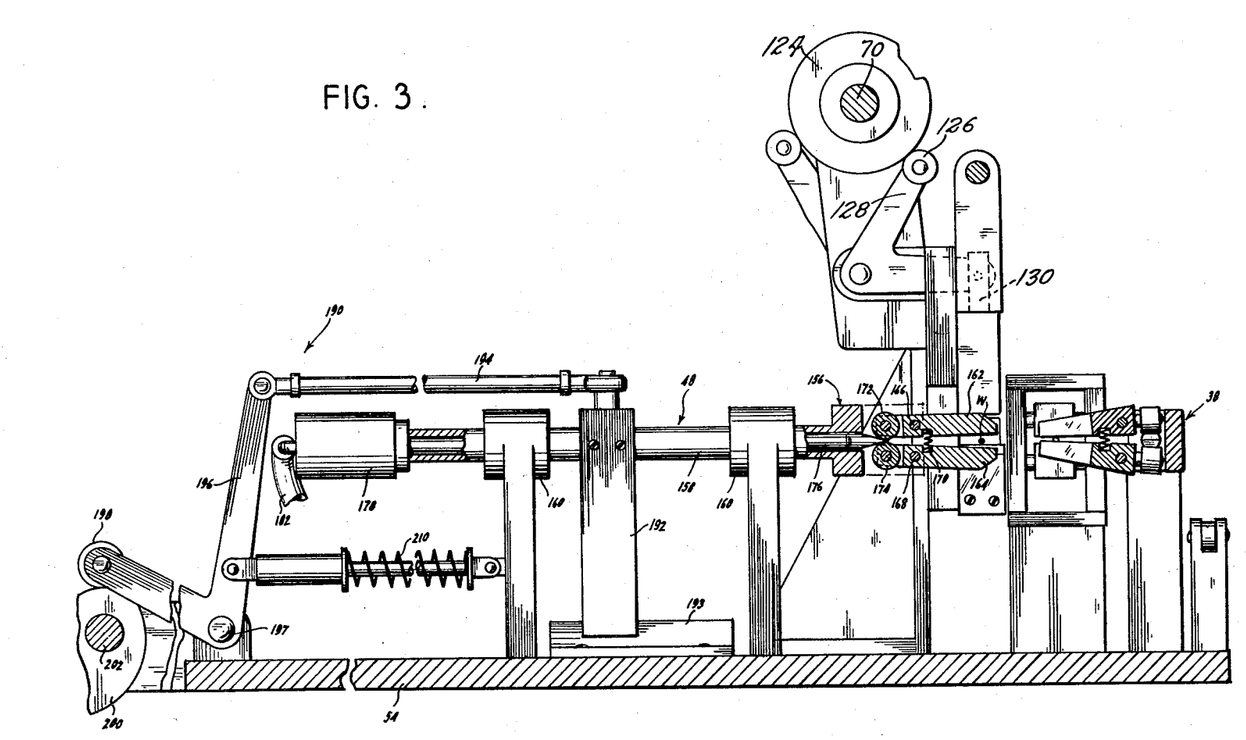
FIG. 3 is an elevational view with parts broken away and sectioned, taken substantially along the line 3—3 of FIGS. 1a and 1b and looking in the direction of the arrows, showing the details of the stud transfer and weld transfer mechanisms.

Stud forming and transfer mechanisms, generally designated by the reference numerals 34, 48 (the former shown in FIG. 2 and the latter shown in FIG. 3), are provided at a location laterally offset from the welding position P for cutting successive studs $s$ from a continuous length of wire W and for thereafter transferring the successive lengths of wire laterally to swaging mechanism, generally designated by the reference numeral 36 (shown in detail in FIG. 3). The swaging mechanism 36 is arranged to flatten the rearward ends of successive studs to provide ear-like projections or terminal portions $p'$. The weld transfer mechanism, generally designated by the reference numeral 38, is arranged to pick up successive swaged studs at the swaging mechanism or station 36 and to transfer the same through an axial thrust at the weld position P toward and into contact with the electrode body $b$ supported on the mandrel 30.

The stud forming and transfer mechanisms 34, 48 include a feeder 40, a clamping device 42 and a movable cutting die 44 arranged along the wire feed path in succession, a stationary cutter 46 adapted to cooperate with the cutting die 44 and stud transfer jaws positioned to receive successive sections of cutoff wire for support and subsequent transfer to the swaging mechanism 36.

Figures 7, 8, 9:
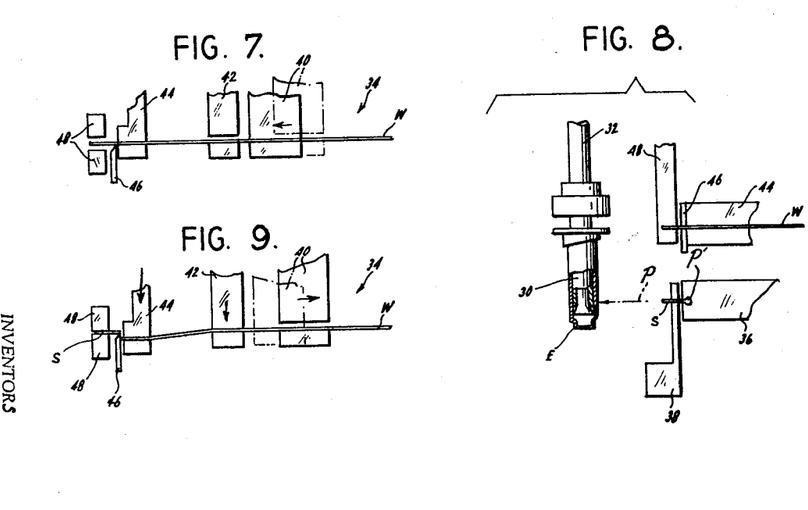
FIG. 7 shows the relative position of the feeding device, the clamping device, the cutting tools and the transfer jaws after feed of a length of wire into position for cutting.
FIG. 8 shows the relationship of the stud forming mechanism of FIG. 7 to the swaging mechanisms at the start of a stud forming and welding cycle.
FIG. 9 is a view similar to FIG. 7, but showing the relation of the parts after cut-off of a length of wire corresponding to one stud.

The successive operations involved in the studding of an electrode body will now be described with reference to FIGS. 7 to 10, inclusive. When the machine is placed in operation, the feeding device 40 closes on the wire W at the dotted line position illustrated in FIG. 7, and then advances through a forward stroke to move a prescribed length of the wire through the movable cutting die 44 and into position to be engaged by the stud transfer mechanism 48. The clamping device 42 closes to grip the wire W for cut-off and the transfer mechanism 48 closes on the stud forming section S to grip the same. As seen in FIG. 9, the cutting die 44 moves laterally relative to the stationary cutter 46 to cut off the prescribed sections S of the wire W, and during this time the feeding device 40 is opened and returns to the retracted position (corresponding to the dotted showing in FIG. 7) for feed of the next length of wire into position for cut-off and transfer.

After the length of wire S is cut off, the closed stud transfer mechanism 48 advances laterally through a prescribed stroke from the retracted position illustrated in FIG. 8, to the advanced position illustrated in FIG. 10, in which the rearward end of the stud S is engaged by the swaging mechanism to form the flattened ear or projection $p^1$. When the stud transfer mechanism 48 is in the advanced position of FIG. 10, the weld transfer mechanism 38 is in position to hold the previously formed stud against the electrode body $b$ for the welding operation. As will be detailed hereinafter, the swaging mechanism 36 includes swaging jaws which close on the rear end of the stud while held by the stud transfer mechanism 48. After the swaging operation is completed, the swaging jaws support the stud by its swaged end whereby the stud transfer jaws are able to retract, and the weld transfer mechanism 38 is able to move into the pickup position of FIG. 8.

After the weld transfer mechanism 38 carries a stud to the electrode E and the stud is welded thereto, the cycle repeats. The electrode E is enclosed by means connected to mandrel 30 to bring the next successive point into the weld position P. When one electrode E is completed it is automatically stripped from the mandrel 30 and the operator then places another electrode in position.

Figure 1A:
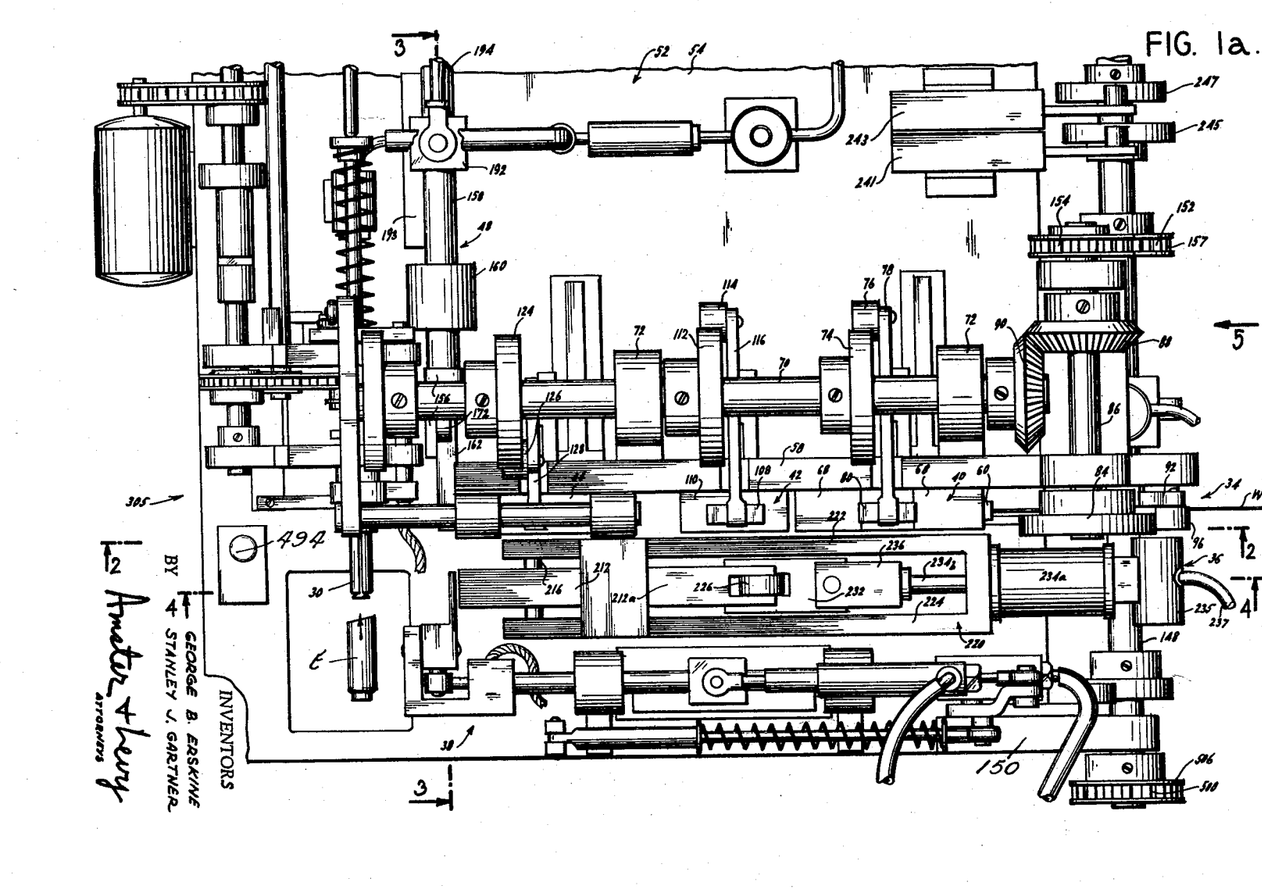
FIGS. 1a and 1b, which are to be placed side by side on the broken lines indicated at the respective margins to make up
Figure 1B:
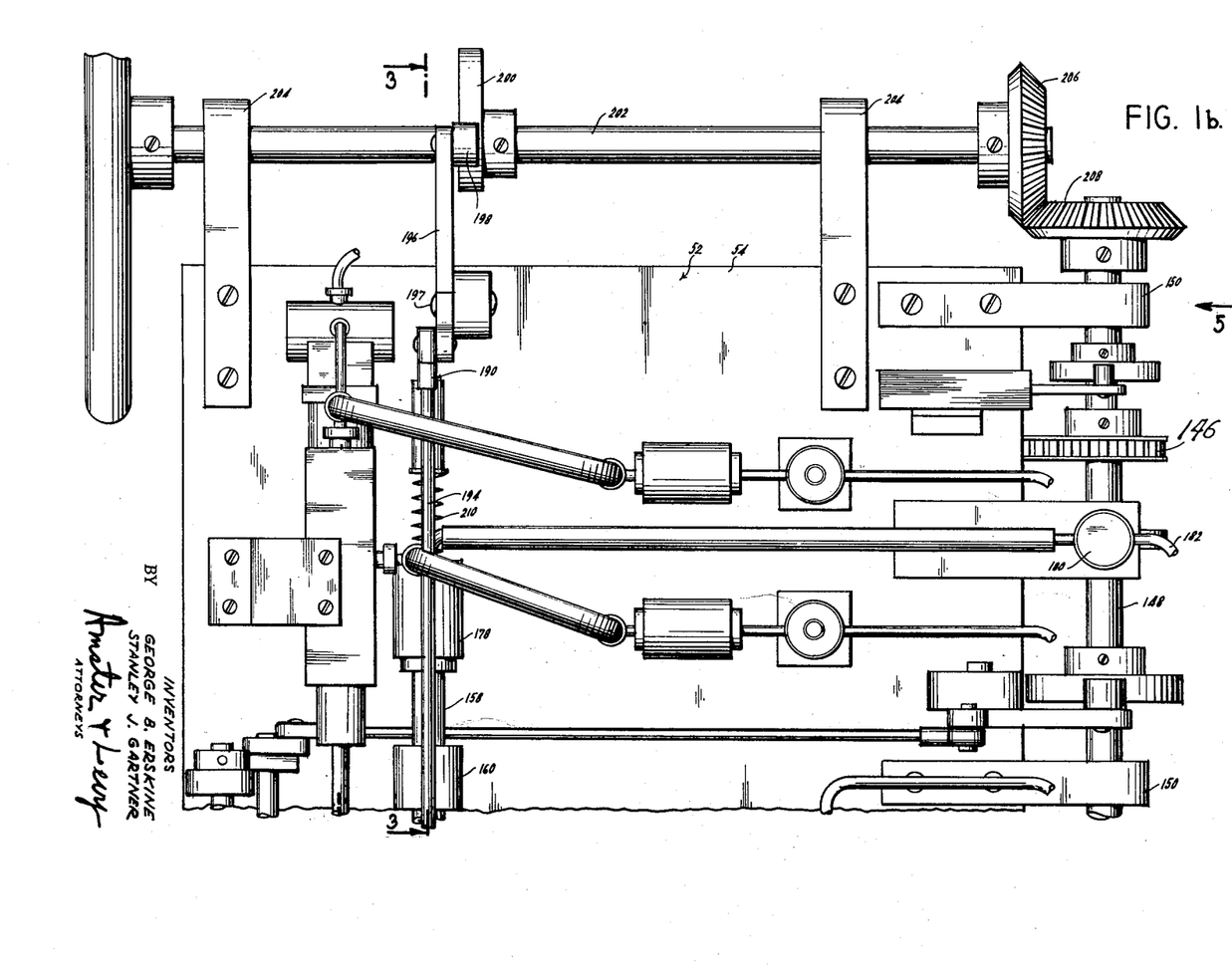

Referring now to FIGS. 1 to 6 of the drawings, detailed reference will be made to the several coordinated mechanisms for studding electrodes in accordance with the present invention. As seen in FIGS. 1 (FIGS. 1$a$ and 1$b$) and 5, the machine includes a bench-like support 52 having a bed plate 54 supported on a number of depending legs 56. Extending from front to rear of the machine is an upstanding wall 58 which along with the bed plate 54 serves to support the various machine components. The numerals employed heretofore, in conjunction with FIGS. 7 to 10 to generally identify the various mechanisms, will be likewise employed in the following detailed description to identify such mechanisms.

Referring now specifically to FIGS. 1 and 2, the stud forming and transfer mechanisms 34 are seen to be located along the upstanding wall 58 intermediate the wall 58 and the swaging mechanism 36. The feeder 40, the clamping device 42 and the movable cutting die 44 are mounted one after another on the upstanding supporting wall 58 and act upon the stud wire W which is fed from a coil or similar supply (not shown), from right to left in FIG. 2, that is, from the rear of the machine toward the front thereof. The feeder is in the form of a laterally movable feeding head having upper and lower jaws 60, 62 mounted for movement as a unit through a predetermined stroke along the length of the wire W to feed a prescribed section $s$ thereof beyond the forward end of the cutting die 44. The action of the feeding head 60, 62 is to close upon the wire W, feed through a forward stroke, open, and return to the starting position for feed of the next length of wire. Such action may be recognized as the familiar four-motion feeding. In the position illustrated in FIG. 2, the feeding head has completed the feed of a section of wire W, the jaws are open and the head has returned to its starting position. The upper feeding jaw 60 is mounted on the lower feeding jaw 62 by upstanding posts and is biased away from the lower feeding jaw 62 by one or more interposed springs 64. The feeding head 40 is mounted for its forward feeding motion and its return by roller supports 66 pivotally mounted on the wall 58 which engage within a track in the undersurface of the lower feeding jaw 62 and guide blocks 68 fixed to the wall 58 which are formed with a track receiving the upper end of the upper feeding jaw 60.

The feeder 40 is controlled and coordinated into the overall machine system from an auxiliary cam shaft 70 which is journaled on a number of appropriate bearings 72. The auxiliary cam shaft 70, which is driven from the main motor of the machine as will be subsequently described, controls both the opening and closing of the jaws 60, 62 of the feeding head 40 and the thrust and return of the feeding head. Specifically, the cam shaft 70 carries a jaw operating cam 74 which is engaged by a cam follower 76 pivotally carried on a cam follower arm 78. The cam follower arm 78 is pivotally connected to a bifurcated operating member 80 which is slidably supported on the upstanding supporting wall 58 and has a roller contact 82 with the upper jaw 60 of the feeding head intermediate the guide blocks 68. The development of the jaw operating cam 74 is selected to close the jaw 60 prior to the beginning of a feeding cycle and to open the jaw 60 at the end of the feeding cycle in appropriate time relation to the advance and return of the feeding head 40. The advance and return of the feeding head is achieved from a head actuating cam 84 which is coupled to the auxiliary cam shaft 70 and to the main drive. As seen in FIG. 1$a$, the cam 84 is disposed at right angles to the cam 74 and is supporting on a coupling shaft 86 connected via meshing bevel gears 88, 90 to the main drive and to the auxiliary cam shaft 70. The head control cam 84 is connected to the feeding head 40 by a double-armed lever 92 which is pivoted at 94 on the supporting wall 58 and has a follower 96 at its upper end in engagement with the cam 84. The lower end of the double-armed lever 92 is pivotally connected via a coupling link 98 to the lower jaw 62 of the feeding head 40. The feeding head 40 is biased into its return or retracted position by a spring 100 supported on a rod 101 which is connected between a stationary abutment 102 on the supporting wall 58 and a further abutment 104 carried on the lower arm of the double-armed lever 92. The development of cam 84 is selected such that during each stud-forming cycle the double-armed lever 92 is rocked about its pivot 94 in the direction appropriate to thrust the coupling link 98 forward (to the left in FIG. 2) through a prescribed feeding stroke against the biasing effect of the spring 100. The length of stud wire fed from the supply during each stud forming cycle may be accurately controlled to appropriate coordination and development of the cams 74, 84, as is understood by those skilled in the art.

Next along the path of the advancing wire W is the clamping device 42 which is shown in the closed position in FIG. 2 preparatory to cut-off of a length of the stud forming wire. The clamping device 42 includes a lower stationary clamping jaw 106 fixed to the supporting wall 58 with its upper face in alignment with the upper face of the feeding jaw 62, and a movable clamping jaw 108 which is mounted for vertical reciprocation on the supporting wall 58 by appropriately formed guide block 110. The movable clamping jaw 108 is closed down on the wire W and against the stationary clamping jaw 106 at the appropriate time in the stud forming cycle by a cam 112 carried on the auxiliary cam shaft 70 and coupled to the movable clamping jaw 108 by a cam follower 114 carried on a cam follower arm 116 which is pivotally connected to the upper bifurcated end of the clamping jaw 108. Closing of the upper clamping jaw 108 provides an accurate stop which precludes axial displacement of the wire W prior to and during cut-off whereby the length of the stud may be accurately established and controlled.

Next along the wire feeding path is the movable cutting die 44 which includes a die body 118 having a bore 120 for the wire W. The bore is substantially in the plane of the upper faces of the jaws 62, 106. The bore 120 opens into a vertically-extending cutting face 122 which cooperates with the stationary cutter 46 to cut off the section of the wire advanced beyond the cutting face 122 in response to downward displacement of the movable cutting die 44. The cutting die 44 is moved downwardly through the prescribed cutting stroke under the control of a cutter operating cam 124 carried on the auxiliary cam shaft 70. The cam 124 is engaged by a follower 126 which is carried on a cam follower arm 128 pivotally connected to a bifurcated rigid extension 130 on the die body 118. The extension 130 is mounted for vertical reciprocation on the supporting wall 58 by an appropriately formed guide block 132. It will be appreciated that appropriate springs (not shown) are operatively connected to the respective cam follower arms 78, 116 and 128 to bias the followers against their associated cams.

Figure 5:
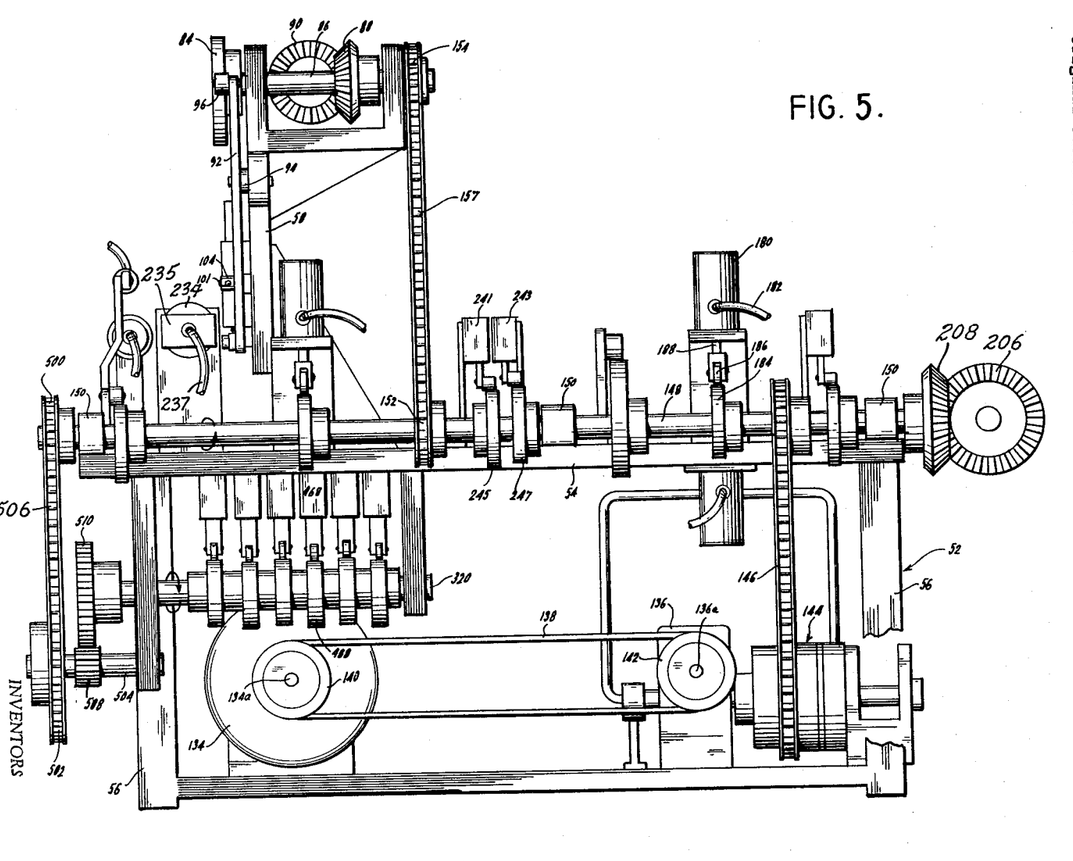
FIG. 5 is a rear elevational view of the machine, taken from the right of FIGS. 1a and 1b and in the direction of the arrow 5.

Reference will now be made to FIGS. 1 and 5 for a description for the drive of the intermeshing beveled gears 88, 90 which rotate the auxiliary cam shaft 70 from the auxiliary coupling shaft 86 to rotate the cams 74, 84 and 124 of the stud forming mechanism. As seen in FIG. 5, a main motor 134 is mounted beneath the bed-plate 54 on the supporting frame 52 and has its output shaft 134a coupled to the input shaft 136a of a reduction gearing unit 136 via a belt 138 trained over the pulleys 140, 142 connected to the respective shafts 134a, 136a. The output shaft of the reduction gearing unit 136 is connected to a pneumatic brake and clutch, generally designated by the numeral 144, which has an output driving sprocket coupled to a chain 146 which is also trained about a driven sprocket carried on the main cam shaft 148. The main cam shaft 148 is journaled on the bed-plate 54 by appropriate bearings 150 and is rotated once during each stud forming, transfer and welding cycle and coordinates many of the inter-related mechanisms which operate during such cycle. If for example six studs are to be welded to an electrode body, the shaft 148 will make one revolution for each sequence of operations required to form, transfer and weld one of the studs. Thus the main cam shaft 148 will make six revolutions from start to finish of the illustrated overall machine cycle. The main cam shaft 148 carries a driving sprocket 152 which is connected to a driven sprocket 154 on the coupling shaft 86 by a chain 157. As previously detailed, the coupling shaft 86 carries the bevel gear 88 which meshes with the bevel gear 90, thereby imparting drive to the auxiliary cam shaft 70 of the stud forming mechanism.

Detailed reference will now be made to FIGS. 1a and 3 for a description of the stud transfer mechanism 48 which incorporates stud transfer jaws arranged to support the successive lengths of the stud wire W fed through the cutting die 44 for cut-off and to laterally transfer successive studs into position for engagement and support by the swaging mechanism 36 while along the thrust line or path P. The stud transfer mechanism 48 includes a stud transfer head 156 which is supported on the bed-plate 54 of the machine for lateral movement across the wire feed path through a transfer stroke. The stud transfer head 156 is carried on a hollow supporting shaft 158 which is journaled on bearings 160 carried by the bed-plate 54 of the machine. As seen in FIG. 3, the stud transfer head 156 includes a pair of stud transfer jaws 162, 164 which are mounted on the head at pivots 166, 168. The forwardly-extending stud-engaging portions of the jaws 162, 164 are biased apart by an interposed spring 170. Pivotally mounted on the rearward end of the jaws 162, 164 are respective jaw-closing rollers 172, 174 which are separated by a thrust member 176 slidable within the supporting shaft 158 and having divergent camming surfaces on its forward end. In response to movement of the thrust member 176 to the right in FIG. 3 through a prescribed stroke, the divergent camming surfaces are effective to urge the rollers 172, 174 apart, thereby closing the jaws 162, 164 on the length of stud wire against the reaction force of the spring 170. The thrust member 176 is driven through its prescribed stroke to cause the jaws 162, 164 to pick up successive lengths of wire at the wire cut-off location by a pneumatic control 178 incorporating an air cylinder and piston which is operated from a source of compressed air via valve 180 in the inlet conduit 182. The inlet conduit 182 is connected to the appropriate source of air under pressure as will be detailed hereinafter, and the timed valving of the air to the piston and cylinder 178 is achieved via the air valve 180 which is opened and closed by a cam 184 on the main cam shaft 148. As seen in FIG. 5, the cam 184 is engaged by a follower 186 carried on a follower arm 188 which in turn controls the opening and closing of the air valve 180. The air valve 180 is of the type that is normally closed and is opened in response to an upward thrust imparted to the cam follower arm 188 as the rise portion of the cam 184 is presented to the cam follower 186. Further details of this control will be more fully appreciated during the detailed description of the schematic diagrams of FIG. 6.

Returning again to FIG. 3, after the stud transfer jaws 162, 164 close upon the cut-off lengths of stud wire W, the transfer head 156 moves through its required forward stroke under control of its actuating mechanism, operating generally designated by the reference numeral 190. The transfer actuating mechanism 190 includes a coupling member 192 fixed to the shaft 158 and guidingly engaged at its lower end by a guide rail 193 on the bed-plate 54 such that the shaft 158, the head 156 and the pneumatic control 178 for the jaws may be advanced through the required stroke. The coupling member 192 is pivotally connected via an adjustable coupling 194 to a bell-crank 196 which in turn is pivoted on the bed-plate 54 at 197. The bell-crank 196 is rocked under the influence of a cam follower 198 which is journaled on one arm thereof and controlled by the cam 200 carried on the further auxiliary cam shaft 202. As seen best in FIG. 1b, the cam shaft 202 is journaled at one end of the machine on appropriate bearings 204 and extends from the front to the rear of the machine frame 52. At the rear side of the machine, the auxiliary cam shaft 202 is coupled to the main cam shaft 148 by intermeshing bevel gears 206, 208 carried respectively on the shafts 202, 148. The cam follower 198 is urged into engagement with its transfer head operating cam 200 by provision of a coil spring 210 which tends to urge the bell-crank 196 in a counter-clockwise direction about the pivot 197 (see FIG. 3). Advantageously, the coupling link 194 is made of adjustable length so that the initial position of the transfer head 156 may be adjusted, if required.

By way of brief review, the stud transfer jaws 162, 164 close upon the wire by the actuation of the thrust member 176; and when closed, the entire transfer head 156 moves from the wire pick-up location at the cutters 44, 46 to the transfer location at the swaging mechanism 36. After the swaging mechanisms operate and support the stud, as now will be described, the stud transfer jaws 162, 164 open and the transfer head 156 retracts to the position for pick-up of the next cutoff length of wire.

Figure 4:
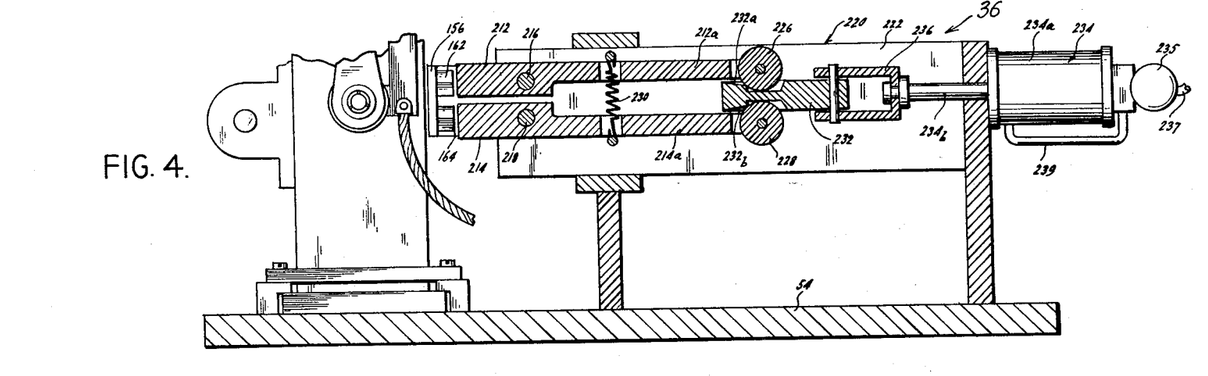
FIG. 4 is an elevational view, taken substantially along line 4—4 of FIG. 1a, with parts broken away and sectioned and looking in the direction of the arrows, showing details of the stud-swaging mechanisms.

Reference will now be made to FIGS. 1, 4 and 5 for the details of the swaging mechanism 36 which receives the transferred stud, swages the rear end thereof, and supports the stud for pick-up by the weld transfer mechanism 38. The swaging mechanism 36 is supported on the bed-plate 54 from front to back of the machine frame and include a pair of swaging jaws 212, 214 which are pivoted at 216, 218 on a bifurcated support 220 having opposite walls 222, 224. As seen in the plan view of FIG. 1a, the jaws 212, 214 are arranged intermediate the walls 222, 224 and terminate at their forward ends in work-engaging portions which are adapted to engage the transferred stud when still supported by the stud transfer jaws 162, 164. The swaging jaws 212, 214 include integral rearward extensions 212a, 214a pivotally supporting rollers 226, 228. The swaging jaws are normally biased apart by a spring 230 which is interconnected between the extensions 212a, 214a and tends to urge the rollers 226, 228 toward each other. A pneumatically-controlled jaw operating mechanism is effective to periodically apply a large spreading force to the rollers 226, 228 whereby the work-engaging portions of the swaging jaws 212, 214 come together with sufficient force to flatten the rearward ends of successive studs brought into the swaging position. The operating mechanisms include a spreading member 232 which is interposed between the rollers 226, 228 and is formed with diverging camming surfaces 232a, 232b. In response to a power stroke imparted to the spreading member 232, which stroke pulls the spreading member 232 to the right in FIG. 4, the rollers 226, 228 are urged apart which brings the swaging jaws 212, 214 into contact with the stud. As the diverging camming surfaces 232a, 232b come between the rollers, the jaws 212, 214 swage the rearward portion of the stud to form the flattened ear or terminal $p^1$. The power stroke is imparted to the spreading member 232 by a pneumatic control 234 which includes a cylinder 234a and a piston shaft 234b connected via a yoke 236 to the spreading member 232. The cylinder is selectively posted by a two-way solenoid controlled valve 235 connected to the inlet conduits 237, 239. The valve is selectively energized by switches 241, 243 under control of the cam 245, 247. The details of the pneumatic control for closing and opening the swaging jaws will be described in conjunction with FIG. 6 of the drawings. For the present, it suffices to point out that the swaging jaws 212, 214 close onto successive studs brought into the swaging position to swage the rearward portions of the studs and to hold the studs for pick-up by the weld transfer mechanism 38.

The weld transfer mechanism, generally designated by the reference numeral 38, picks up the studs from the swaging mechanism and transports them to the welding position P where they are welded to the electrode. The electrode itself is supported on the mandrel 30 which is in turn supported to the work-support head generally designated by the reference numeral 305. Means are provided to index the mandrel 30 at each cycle of the machine for the proper placement of the stud against the electrode. After the welding has been completed the electrode is stripped from the mandrel 30 by means provided for that purpose.

Figure 6:
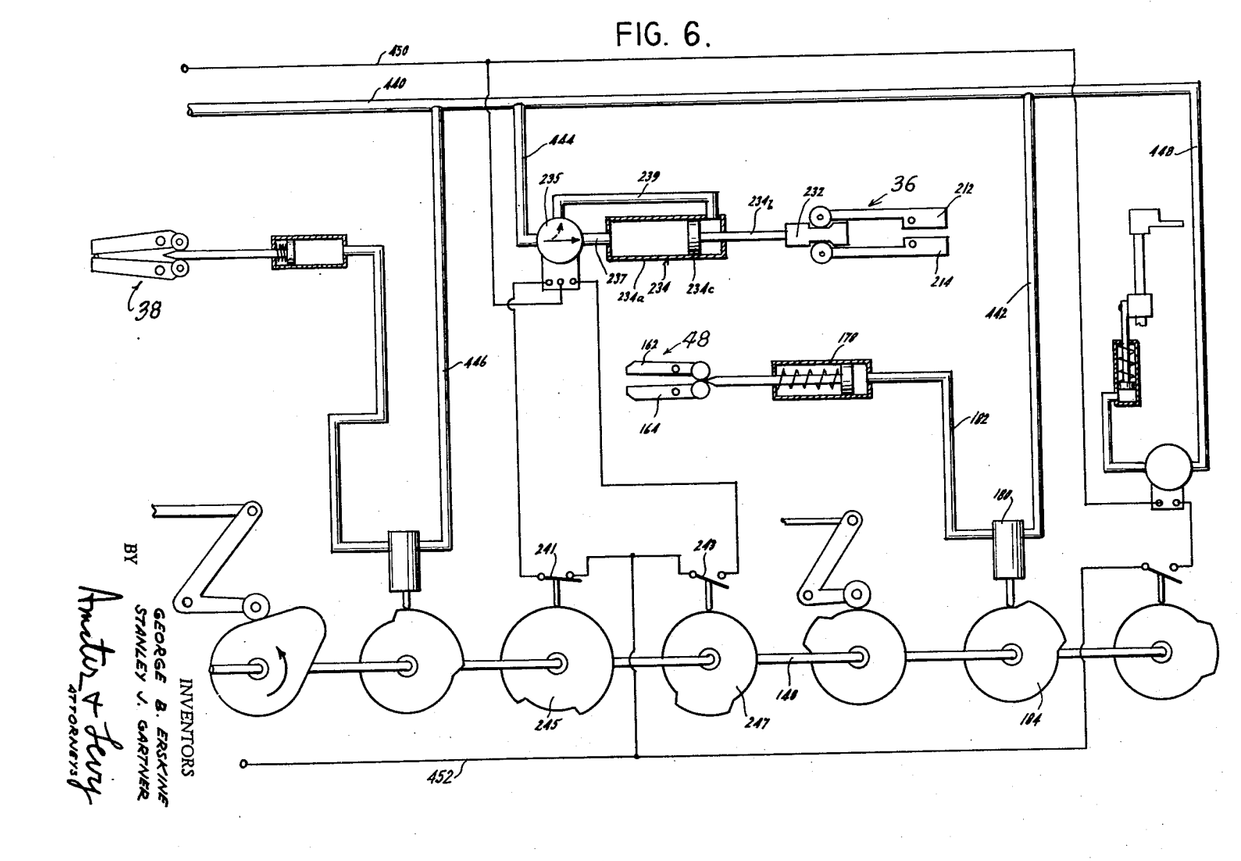
FIG. 6 is a combined schematic and diagrammatic showing of the several inter-related functions which occur during the forming, swaging, transferring and welding of each stud during a typical stud forming and welding cycle.

Detailed reference will now be made to the diagrammatic showing of FIG. 6, which will be supplemented by reference to other figures of the drawings for further description of the machine and a typical sequence in the forming, transferring and welding of one stud. The pneumatic system includes a main conduit 440 which is connected to an appropriate compressor (not shown) and includes a first branch 442 connected via the valve 180 to the inlet conduit 182 to the pneumatic control 178 of the stud transfer mechanisms, a second branch 444 connected via the valve 235 to the inlet conduits 237, 239 of the pneumatic control 234 for the swaging mechanism, a third branch 446 connected to the pneumatic control of the weld transfer mechanism, and a fourth branch 448 connected to the inlet conduit of the pneumatic control for weld timing and pressure application.

The electrical system includes input lines 450, 452, the input lines 450, 452 selectively energize the solenoid-controlled valves 235 via the switches 241, 243.

For the sake of illustration, the various elements have been shown diagrammatically and the several cams on the main cam shaft 148 have been turned at right angles to the cam shaft 148 so that the development of the cams may be seen and the relationship of the timing in a typical stud forming and welding cycle may be more fully appreciated. It is assumed that the cam shaft rotates in a direction to turn the cams counter-clockwise in the showing of FIG. 6, as shown by the directional arrow. At the start of operation, the mechanisms are in the position illustrated in FIG. 8 with a completed stud ready for transfer by the weld transfer mechanism 38 and a length of the wire W advanced into position for cut-off and stud transfer. The sequence is substantially as follows:

The stud transfer jaw operating cam 184 opens the valve 180 to admit air under pressure into the pneumatic control 178 to close the stud transfer jaws 162, 164. The actuation of the stud transfer jaws is effective to advance the cut-off length of wire toward the swaging jaws 212, 214. At about the same time in the cycle the weld transfer mechanism 38 picks up the swaged stud for the swaging station and transports it to the welding position P. There it is welded to the electrode. While the stud is being welded the swaging jaws 212, 214 close upon the transferred stud while supported by the stud transfer jaws 162, 164 to support the next completed stud in position for pickup by the weld transfer mechanism 38. The solenoid control valve 235 of the swaging mechanism normally directs the air under pressure through the inlet conduit 237 under control of the normally closed switch 241 which is operated by the cam 245. When the swaging jaws are too close, cam 247 closes the switch 243 (and almost simultaneously the cam 245 opens the switch 241), whereupon the air is ported into the inlet conduits 39 for driving the piston staff 234b through the power stroke for operation of the swaging jaws 212, 214. The illustrative showing in FIG. 6 is not intended to be an accurate portrayal of the development of the several cams on the shaft 148, but rather is intended to pictorially illustrate the various controls and to more or less indicate the timing as previously described in greater detail.

Reference will now be made to FIG. 5 to illustrate the over-all operation of the machine. Switch 468 is shown dependent on cam 488 which is mounted on the lower cam shaft 320. Switch 468 controls the pneumatic valve which governs the main brake and clutch 144. At the start of the operation the switch 468 is in its open position and governed by cam 488 such that the brake is on in brake and clutch unit 144. The open switch 468 is by-passed by a push button start switch 494 which is seen in FIG. 1a to be in a location on the bench-like support adjacent to the mandrel 30 and readily accessible to the operator. The push button start switch 494 is depressed to initiate operation, releasing the brake and engaging the clutch of unit 144.

The lower cam shaft 320 is coupled to and driven by the upper cam shaft 148 via an appropriate sprocket and gear coupling including a driving sprocket 500 connected to the upper cam shaft 148, a driven sprocket 502 connected to a coupling shaft 504, a chain 506 trained over the sprockets 500, 502, a first spur gear 508 on the coupling shaft 504, and a second spur gear 510 in meshing engagement with the first spur gear and connected to the lower cam shaft 320. The gear reduction obtained via this coupling causes the lower cam shaft 30 to turn once during every six revolutions of the upper cam shaft for the illustrated electrode type. This is so because in this illustrative embodiment a set-up capable of studding an electrode with six studs was contemplated. The other cams on shaft 320 control the indexing of the mandrel about its axis and along its length.

The mechanisms and controls incorporated into our machine are such as to render the same readily convertible from one type of studding operation to another with a minimum amount of complexity and with a comparatively short change-over time. For example, if only two studs are to be welded at each circumferential location, the upper cam shaft is arranged to rotate four times for one rotation of the lower cam shaft and the mandrel indexing mechanism is arranged to index the mandrel through 180° in response to each rotation of the upper cam shaft. This change-over is essentially completed by changing the gearing between the upper and lower cam shafts.

A latitude of modification, change and substitution is intended in the foregoing disclosure and in some instances, some features of the invention will be used without a corresponding use of other features. Accordingly, it is appropriate that the appended claims be construed broadly and in a manner consistent with the scope and spirit of the contribution herein.

What we claim is:

1. In a machine for the manufacture of studded electrodes of the type having a body and one or more radially-extending studs welded thereto, a stud-transfer mechanism having movable jaws adapted to engage successive studs and including operating means for engaging said stud-transfer mechanism on successive studs, actuating means for said stud-transfer mechanism operable to advance successive studs into a swaging position, a swaging mechanism at said swaging position having a pair of opposed jaws adapted to close on and swage the rear ends of successive studs while held by said stud-transfer mechanism and including operating means for closing said swaging mechanism on successive studs at said swaging position, the operating means and actuating means for said stud-transfer mechanism being operable in a timed relation to the operating means for said swaging mechanism whereby the latter supports successive studs while said stud-transfer mechanism returns to engage the next stud.

2. In a machine for the manufacture of studded electrodes of the type having a body and one or more radially-extending studs welded thereto, stud-forming means arranged to bring successive studs into a transfer position, a stud-transfer mechanism including pivotally mounted jaws adapted to engage successive studs at said transfer position and including operating means for engaging said stud-transfer mechanism on successive studs, actuating means for said stud-transfer mechanism operable to advance successive studs into a swaging position, a swaging mechanism at said swaging position including a pair of opposed jaws adapted to close on and swage the rear ends of successive studs while held by said stud-transfer mechanism and including operating means for closing said swaging mechanism on successive studs at said swaging position, the operating means and actuating means for said stud-transfer mechanism being operable in a timed relation to the operating means for said swaging jaws whereby the latter supports successive studs while said stud-transfer mechanism returns to engage the next stud.

3. In combination, a machine frame, stud-forming means mounted on said frame and arranged to bring successive studs into a transfer position, a stud-transfer mechanism mounted on said frame including pivotally mounted jaws and adapted to engage successive studs at said transfer position and including operating means for engaging said stud-transfer mechanism on successive studs, actuating means for said stud-transfer mechanism operable to advance successive studs into a swaging position, a swaging mechanism mounted on said frame at said swaging position including a pair of opposed swaging jaws adapted to close on and swage the rear ends of successive studs while held by said stud-transfer mechanism and including operating means for closing said swaging jaws on successive studs at said swaging position, the operating means and actuating means for said stud-transfer mechanism being operable in a timed relation to the operating means for said swaging mechanism whereby the latter supports successive studs while said stud-transfer mechanism returns to engage the next stud.

References Cited in the file of this patent

UNITED STATES PATENTS

| | | |
|---|---|---|
| 435,110 | Burton | Aug. 26, 1890 |
| 459,931 | Gutberlet | Sept. 22, 1891 |
| 626,234 | Hubbard | June 6, 1899 |
| 1,381,810 | Dayton | June 14, 1921 |
| 1,914,514 | Lapham | June 20, 1933 |
| 2,011,877 | Shaff | Aug. 20, 1935 |
| 2,336,726 | Ferguson | Dec. 14, 1943 |
| 2,766,631 | Van Sitter | Oct. 16, 1956 |
| 2,951,933 | Erskine et al. | Sept. 6, 1960 |

FOREIGN PATENTS

| | | |
|---|---|---|
| 885,157 | France | Sept. 7, 1943 |